Oct. 9, 1956
G. H. CARROLL
2,765,647
MULTIPLE LOCKING MECHANISM CONTROL
Filed Nov. 16, 1953
2 Sheets-Sheet 1
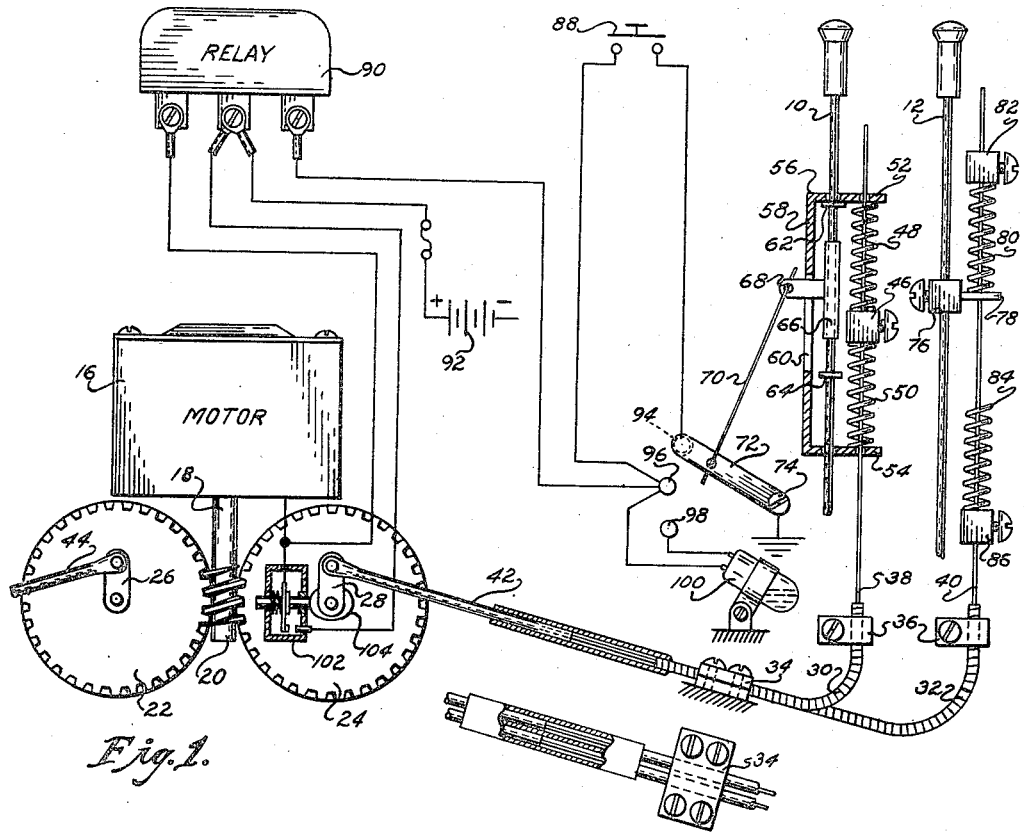
INVENTOR.
Glenn H. Carroll
BY
ATTORNEY Oct. 9, 1956

G. H. CARROLL 2,765,647

MULTIPLE LOCKING MECHANISM CONTROL

Filed Nov. 16, 1953

INVENTOR.
GLenn H. Carroll
BY
ATTORNEY 2,765,647
Patented Oct. 9, 1956

2,765,647

MULTIPLE LOCKING MECHANISM CONTROL

Glenn H. Carroll, Overland Park, Kans.

Application November 16, 1953, Serial No. 392,361

12 Claims. (Cl. 70—264)

This invention relates to equipment for automotive vehicles, the primary object being to provide an automatic control for the locks of the doors of automobile bodies operable to simultaneously raise or lower the plungers of the locks upon closing of a switch which in turn energizes an electric motor.

It is the most important object of the present invention to provide an automatic control of the aforementioned character that includes an electric motor operably coupled with the reciprocable plungers of automobile door locks in a manner to permit locking or unlocking of all of the doors simultaneously merely by manually shifting one of the plungers either from the inside of the body or exteriorly thereof through use of a key in the usual manner.

Another important object of this invention is to provide a control system of this type which may include an auxiliary switch readily accessible from within the interior of the automobile body to automatically lock or unlock all of the doors, thereby eliminating the necessity of depressing and retracting the lock plungers individually.

A further object of the present invention is to provide a system wherein is included a safety factor in the nature of a mercury switch or the like to automatically unlock all of the doors simultaneously in the event of an automobile accident which would tip or overturn the automobile.

Other objects include important details of construction all of which will be made clear as the following specification progresses.

In the drawings:

Figure 1 is a schematic and diagrammatical view showing one form of multiple locking mechanism control for automotive vehicles and the like, made pursuant to my present invention.

Fig. 2 is a wiring diagram illustrating the electrical components of the control shown in Fig. 1.

Fig. 3 is a fragmentary, detailed plan view of a portion of the cable connection with the reciprocable lock plungers.

Figure 4:
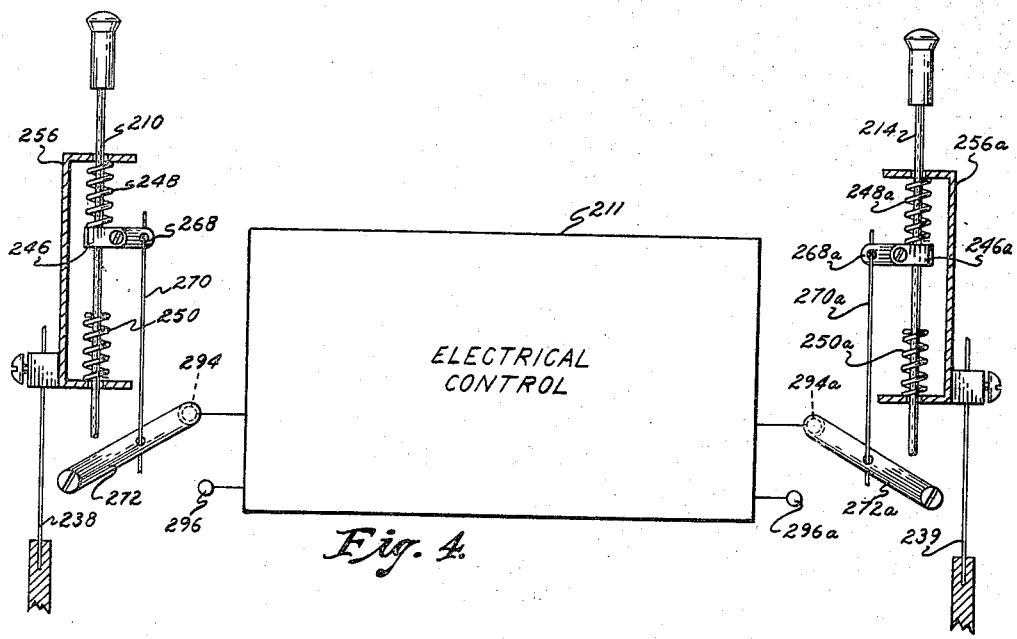
Fig. 4 is a schematic view, parts being shown in section and illustrating a modified form of multiple locking mechanism control made pursuant to my present invention.

It is common knowledge that the doors of many automotive vehicles are normally provided with individual locks that may be operated from inside of the body through use of a vertically reciprocable plunger. At least one of the locks is also operable through use of a key and accessible exteriorly of the automobile body.

The precise nature of such locks forms no part of the present invention and has, therefore, not been illustrated in the drawings. However, the aforementioned plungers are illustrated in Fig. 1 and for purposes of illustration, there is shown but one pair of such plungers designated by the numerals 10 and 12 respectively. It may be assumed in reference to Fig. 1 of the drawings that the plungers 10 and 12 correspond to any two locks of the automobile body, but for clarity, it shall be hereinafter understood that plunger 10 corresponds to the left front door and plunger 12 corresponds to the left rear door of an automobile. In Fig. 2 of the drawings however, the plungers therein schematically illustrated, shall be assumed to correspond to the two front doors of an automobile and are, therefore, designated by the numerals 10 and 14.

In accordance with the principles of the embodiment of my invention shown in Figs. 1 and 2 of the drawings, there is provided an electric motor 16 having a drive shaft 18 upon which is formed a worm 20. A pair of worm gears 22 and 24 are suitably mounted in mesh with the worm 20 therebetween and provided with cranks 26 and 28 respectively which are mounted for rotation therewith.

Flexible cables 30 and 32 held by suitable brackets 34 and 36 have wires 38 and 40 respectively reciprocable therein and pivotally joined to the crank 28 by rods 42. As shown in Fig. 1, it is preferred that bracket 34 be spaced from the axis of gear 24 sufficiently to provide the proper push-pull action on wires 38 and 40.

It is now seen in Fig. 1 of the drawings that, as the crank 28 is rotated, the stretches of the wires 38 and 40 above the brackets 36 will reciprocate along vertical, rectilinear paths of travel. In a 4-door automobile therefore, the lock plungers for the right front door and right rear door (not shown) will be operated from the crank 26 through rods 44 (one only being seen in Fig. 1) having a pair of cables operably connected thereto in the same manner as just above described with respect to the plungers 10 and 12.

A collar 46 adjustable on the wire 38 and normally rigid thereto, is interposed between a pair of springs 48 and 50 coiled about the wire 38. The springs 48 and 50 are in turn embraced by an upper leg 52 and a lower leg 54 of a U-shaped slide 56 having a bight 58 provided with a vertical slot 60. It is noted in Fig. 1 of the drawings that legs 52 and 54 are not only perforated to receive and slide on the plunger 10, but are perforated to slidably receive the wire 38.

A pair of spaced-apart stops 62 and 64 are provided on the plunger 10 between the legs 52 and 54, and a sleeve 66 is slidable on the plunger 10 between the stops 62 and 64 but normally spaced therefrom. A lateral finger 68 on sleeve 66 extends through the slot 60 for vertical reciprocation therein and a rod 70 pivotally interconnects the finger 68 and a switch arm 72 swingable on a pivot pin 74.

The plunger 12 has an adjustable collar 76 rigidly secured thereto that is in turn provided with a lateral extension 78 perforated to slidably receive the wire 40. It is obvious that extension 78 could receive a rod as at 70 in the same way as finger 68 if it were desired to actuate a switch thereby.

A spring 80 is coiled on the wire 40 between extension 78 and a stop 82 mounted on the wire 40. A lowermost spring 84 is coiled on the wire 40 between extension 78 and a stop 86. It is contemplated that there be included a switch 88 on the automobile door that is provided with the plunger 10, the switch 88 being accessible exteriorly of the automobile and preferably next adjacent the door handle near the lock or that part thereof which is provided with a slot to receive a key.

Figure 1 of the drawings shows additionally an electric relay 90, automobile battery 92 and three stationary contacts 94, 96 and 98 engageable by the switch arm 72 when the same is swung on pivot 74. A normally open mercury switch 100 is suitably mounted within the automobile to close whenever the automobile is tipped over and as noted in Figs. 1 and 2, the switch 100 has direct connection with the stationary contacts 96 and 98. A normally open motor switch 102 is disposed for actuation by an elliptical cam 104 mounted for rotation with the worm gear 24 and the crank 28.

Referring now to Fig. 2 of the drawings, it is seen that the relay 90 and motor 16 are normally deenergized and the switch 102 is normally held open by the cam 104 whenever the switch arm 72 operably connected with the plunger 10, is in engagement with stationary contact 94.

When however, the plunger 10 is depressed downwardly to swing the switch arm 72 to contact 96 through rod 70, a circuit is closed through coil 106 of relay 90 that is in series with battery 92, it being noted that both the battery 92 and the switch arm 72 are grounded.

Energization of the coil 106 in this manner, closes switch 108 of relay 90 to in turn close a circuit through the motor 16 which is then coupled in series with the battery 92, motor 16 also being grounded to complete the circuit. When motor 16 commences operating, cam 104 is immediately rotated to a position where switch 102 closes and such operation of the motor 16 will continue, notwithstanding further movement of the plunger 10 to a position where switch arm 72 moves into engagement with contact 98. It is to be noted that when arm 72 swings away from the contact 96, coil 106 of relay 90 will be deenergized and the switch 108 will open, but this will not affect continued operation of the motor 16 since the switch 102 is now closed.

After the cam 104 has rotated 180°, the switch 102 will be reopened by the cam 104 and motor 16 will be deenergized.

Referring again to Fig. 1 of the drawings, and assuming that the worm gear 24 rotates anti-clockwise, the wires 38 and 40 are first pulled downwardly from the stand-by position shown in Fig. 1.

The collar 46 will act on the spring 50 and the leg 54 of slide 56 to pull the latter downwardly and the leg 52 bearing against the stop 62, will thereby depress the plunger 10 to the locked position. Similarly, the stop 82 will force the extension 78 downwardly through spring 80 to thereby depress the plunger 12.

Such downward movement of the plunger 10 swings the switch arm 72 through sleeve 66, finger 68 and rod 70, first to the contact 96 and thence to the contact 98. This action all takes place during the first 90° rotation of the worm gear 24, the crank 28 and the cam 104. As these parts continue to rotate another 90°, the wires 38 and 40 return to the position shown in Fig. 1, but inasmuch as wire 40 is freely slidable in extension 78 and since wire 38 is freely slidable in the legs 52 and 54, and since the slide 56 is free to move upwardly relative to the plunger 10, sleeve 66 and finger 68, both plungers 10 and 12 remain depressed in the locked position.

The same action, i. e., depressing of the plungers 10 and 12, may be accomplished by closing the switch 88 rather than by actual manual depressing of the plunger 10.

It may be desirable to further provide for automatic operation by utilization of a switch 110 on the dashboard of the automobile, thereby permitting the driver to lock or unlock all of the doors from inside the automobile body without having to actually manipulate any of the plungers manually. The switch 88 however, is coupled as shown in Fig. 2 to permit operation of the motor 16 only when the doors are unlocked, it being remembered that switch 88 is disposed exteriorly of the automobile body and should not be adapted for unlocking of the doors. In other words, arm 72 must engage contact 94 before switch 88 can be used to energize motor 16.

Unlocking of all of the doors simultaneously may be accomplished in three ways, i. e., closing of the switch 110, pulling the plunger 10 upwardly from within the automobile body, or use of a key outside of the automobile body which in turn raises the plunger 10 to the unlocked position shown in Figs. 1 and 2.

When the arm 72 is thus moved from the contact 98 to the contact 96, relay 90 is initially energized to start the motor 16, switch 102 is thereupon again closed and the motor 16 continues to operate even though the arm 72 moves further to the position shown in Figs. 1 and 2 in engagement with contact 94. Here again, the wires 38 and 40 first move upwardly from the position shown in Fig. 1 to retract plungers 10 and 12 and thereupon return to the stand-by position shown in Fig. 1 before the cam 104 reopens the switch 102 and thereby deenergizes the motor 16.

In actual practice it is but necessary to provide one switch arm 72 and its associated contacts 94, 96 and 98 operably coupled with one of the plungers such as plunger 10 associated with the left front door for example. The remaining three plungers in a 4-door automobile, may be operably coupled with the control through use of collar 76, springs 80 and 84 and associated parts shown connected with plunger 12 in Fig. 1. During operation, the crank 28 raises and lowers plungers 10 and 12 on one side of the automobile body and the crank 26 raises and lowers the plungers on the opposite side of the automobile body.

However, many automobiles are provided with locks on both front doors of such nature as to permit key operation. In that event, the plunger 14 of the second front door may be equipped with a switch arm 72a, and contacts 94a, 96a and 98a to operate the motor 16 in the same manner as above described. Similarly, the second front door may be provided with an external switch 88a, all as shown in Fig. 2 of the drawings. The mercury switch 100 is coupled as shown at Fig. 2 to automatically energize the motor 16 only when the arm 72 is in engagement with the contacts 98 to automatically unlock all four doors.

It is particularly notable that the control hereof is operably coupled with the plungers in such manner as to permit free manual operation thereof in the usual manner. As seen in Fig. 1, plungers 10 and 12 may be depressed or retracted without effecting movement of the wires 38 and 40.

Figure 5:
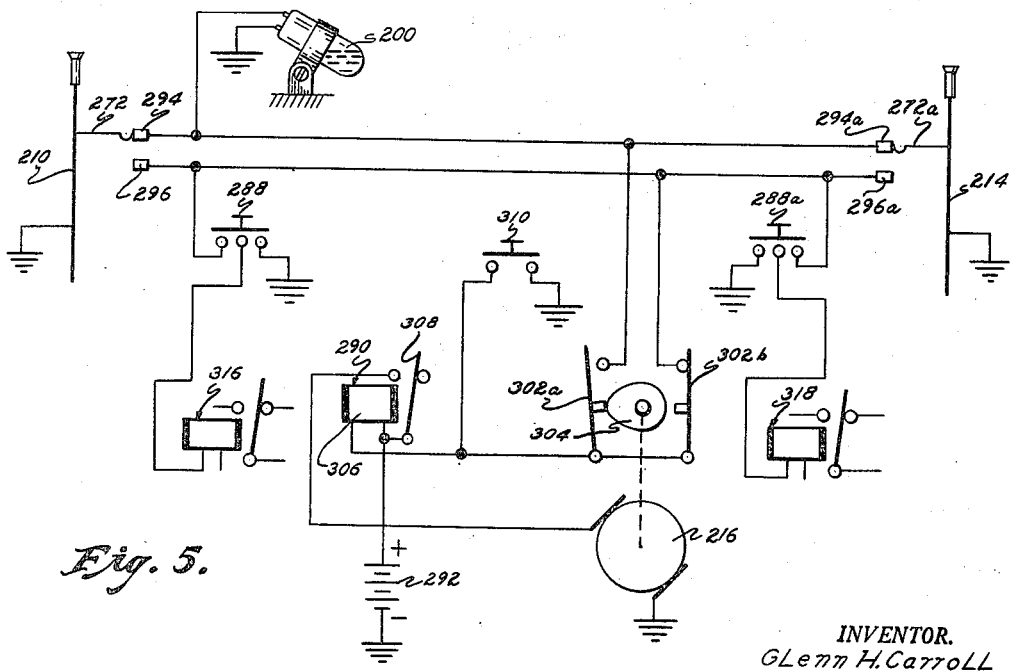
Fig. 5 is a wiring diagram illustrating the electrical components of the system shown in Fig. 4.

In the modification of my invention, shown in Figs. 4 and 5 of the drawings, it may be assumed that plungers 210 and 214 correspond to the locks of the two front doors of an automobile and are operably coupled with an electric motor 216 through wires 238 and 239, it being understood that motor 216 will be provided with a crank (not shown) similar to crank 28 for operating the wire 238 and a crank (not shown) similar to crank 26 for operating the wire 239. Switch arms 272 and 272a are swingably mounted and normally engageable with stationary contacts 294 and 294a respectively. When the plungers 210 and 214 are depressed, the arms 272 and 272a move into engagement with stationary contacts 296 and 296a respectively. The remaining electrical components of the embodiment shown in Figs. 4 and 5, including the motor 216, are broadly designated by the numeral 211 in Fig. 4 of the drawings.

Wires 238 and 239 are rigidly secured to U-shaped slides 256 and 256a that are in turn slidable on plungers 210 and 214 respectively. Collars 246 and 246a are rigid to the plungers 210 and 214 respectively. Slide 256 reciprocates the collar 246 and, therefore, the plunger 210 through springs 248 and 250, coiled on the plunger 210. Springs 248a and 250a are similarly provided on the plunger 214. Fingers 268 and 268a on the collars 246 and 246a respectively, are pivotally connected with arms 272 and 272a by rods 270 and 270a.

The provision of the springs 48—50, 80—84, 248—250, and 248a—250a has many advantages. They serve to cushion the shock when the motors operate to raise or depress the plungers. By their inclusion, critical adjustments between the plungers and the operating mechanism therefor is eliminated. And, they tend to yield to the force of the operating mechanism if the plungers tend to stick or jam and fail to reciprocate freely as they should.

The electrical control 211 includes in addition to motor 216, a relay 290 having a coil 306 and a switch 308. A pair of motor switches 302a and 302b, one of which is open and the other of which is closed during standby, are controlled by a cam 304 operably coupled with the motor 216 in the manner described with respect to Figs. 1 to 3 inclusive. Switches 288 and 288a correspond to switch 88 in Figs. 1 and 2, and a mercury switch 200 is provided to automatically unlock the doors in the event of over-turning of the automobile. Mounting of switches 100 and 200 at a substantially 45° angle is advantageous in that they will then become operable even in accidents where the automobile is tipped on its longitudinal axis as well as its transverse axis.

A dashboard switch 310 is adapted to either lock or unlock the doors differing, therefore, from switches 288 and 288a in that the latter two switches are capable only of locking the doors.

In operation, depressing of either of the plungers 210 and 214, or forcing the same downwardly through use of a key, or closing of any of the switches 288, 310 or 288a, will energize coil 306 to automatically lock all four doors simultaneously. When switch 310 is closed, it is placed in series with the coil 306 and battery 292. When switch 288 or switch 288a is closed, or when arms 272 engage contact 296, or when arm 272a engages contact 296a, the circuit is closed through motor switch 302b, coil 306 and battery 292.

Upon closing of relay switch 308, which is in series with motor 216, the latter is energized and continues to operate until the cam 304 opens the switch 302b, thereby deenergizing coil 306 and the motor 216 notwithstanding the fact that the arms 272 and 272a will then both be in engagement with contacts 296 and 296a respectively. As soon as motor 216 is energized, cam 304 will move to a position closing the motor switch 302a, thereby conditioning the circuit for the next operation of motor 216 to unlock the doors.

Many modern day automobiles are provided with automatic window controls and it is seen that the circuit 211 may be coupled with one or more window-lift relays 316 and 318 if desired, whereby a single operation on the part of the operator will not only close all four doors, but will also close all of the windows of the automobile. Relays 316 and 318 are coupled for operation upon closing of either of the switches 288 or 288a. The manner of connecting the relays 316 and 318 with the windows, forms no part of the present invention and has, therefore, not been illustrated in Fig. 5 of the drawings.

Having thus described the invention what is claimed as new and desired to be secured by Letters Patent is:

1. For an automotive vehicle having a body provided with a number of doors each having a lock provided with a reciprocable plunger, control means including an electric motor; mechanism operably connecting the motor with said plungers for reciprocating the latter upon energization of the motor; an electric relay having a coil and a switch; a manual switch coupled with said coil for energizing the latter to close the relay switch; means operably coupling the relay switch with the motor to energize the latter upon closing of the relay switch; a motor switch for energizing the motor after opening of the manual switch to deenergize the coil and open the relay switch; and cam means operably connected with said motor for opening the motor switch upon predetermined upward or downward movement of the plungers.

2. For an automotive vehicle having a body provided with a number of doors each having a lock provided with a reciprocable plunger, control means including an electric motor; mechanism operably connecting the motor with said plungers for reciprocating the latter upon energization of the motor; an electric relay having a coil and a switch; a manual switch coupled with said coil for energizing the latter to close the relay switch; means operably coupling the relay switch with the motor to energize the latter upon closing of the relay switch; a motor switch for deenergizing the motor and the coil; and cam means operably connected with said motor for opening the motor switch upon predetermined upward or downward movement of the plungers.

3. For an automotive vehicle having a body provided with a number of doors each having a lock provided with a reciprocable plunger, control means including an electric motor; and mechanism operably connecting the motor with said plungers for reciprocating the latter upon energization of the motor, said mechanism including a rotatable crank operably connected with said motor, a cable for each plunger respectively, structure operably connecting the cables with the plungers, and means joining the cables to the crank for reciprocating the plungers as the crank is rotated.

4. For an automotive vehicle having a body provided with a number of doors each having a lock provided with a reciprocable plunger, control means including an electric motor; and mechanism operably connecting the motor with said plungers for reciprocating the latter upon energization of the motor, said mechanism including a cable for each plunger respectively, structure operably connecting the cables with the plungers, and means interconnecting the cables and the motor for alternately reciprocating the cables when the motor is energized, and limit means associated with said motor for deenergizing the motor when the cables are intermediate the ends of the paths of travel thereof.

5. For an automotive vehicle having a body provided with a number of doors each having a lock provided wtih a reciprocable plunger, control means including an electric motor; mechanism operably connecting the motor with said plungers for reciprocating the latter upon energization of the motor; an electric relay having a coil and a switch; a manual switch coupled with said coil for energizing the latter to close the relay switch; means operably coupling the relay switch with the motor to energize the latter upon closing of the relay switch; a motor switch for energizing the motor after opening of the manual switch to deenergize the coil and open the relay switch; and cam means operably connected with said motor for opening the motor switch upon predetermined upward or downward movement of the plungers, said mechanism including a rotatable crank operably coupled with said motor, a cable for each plunger respectively, structure operably connecting the cables with the plungers, and means joining the cables to the crank for reciprocating the plungers as the crank is rotated.

6. For an automotive vehicle having a body provided with a number of doors each having a lock provided with a reciprocable plunger, control means including an electric motor; mechanism operably connecting the motor with said plungers for reciprocating the latter upon energization of the motor; an electric relay having a coil and a switch; a manual switch coupled with said coil for energizing the latter to close the relay switch; means operably coupling the relay switch with the motor to energize the latter upon closing of the relay switch; a motor switch for deenergizing the motor and the coil; and cam means operably connected with said motor for opening the motor switch upon predetermined upward or downward movement of the plungers, said mechanism including a rotatable crank operably coupled with said motor, a cable for each plunger respectively, structure operably connecting the cables with the plungers, and means joining the cables to the crank for reciprocating the plungers as the crank is rotated.

7. In an automotive vehicle having a body provided with a number of doors each having a lock provided with a reciprocable plunger, plunger control means comprising an electric motor having a rotatable shaft, mechanism operably connecting the motor with said plungers for reciprocating the latter upon energization of the motor said mechanism including a cable for each plunger respectively, structure operably connecting the cables with the plungers, means interconnecting the cables and the motor including at least one crank operably coupled with the shaft for rotation therewith whereby the cables are reciprocated upon rotation of the shaft, and limit means associated with said motor for deenergizing the motor when the cables are intermediate the ends of the paths of travel thereof.

8. For an automotive vehicle having a body provided with a number of doors each having a lock provided with a reciprocable plunger, plunger control means as set forth in claim 7 wherein said limit means comprises a cam operably coupled with said crank for rotation therewith and a limit switch electrically coupled with the motor, said switch having a contact arm within the path of travel of the cam whereby upon rotation of the latter said switch is alternately opened and closed.

9. For an automotive vehicle having a body provided with a number of doors each having a lock provided with a reciprocable plunger, plunger control means as set forth in claim 7 wherein the structure operably connecting at least one of said cables with its plunger comprises a collar on said one cable; a U-shaped slide element having a bight and a pair of spaced legs, the latter each being slidably mounted on the said one cable and its plunger; a pair of spaced stops on the plunger between the legs; and a spring between each of said legs respectively and said collar, one of said legs being engageable with one of said stops during reciprocation of the said one cable toward one end of its path of travel, the other of said legs being engageable with the other of said stops during reciprocation of said one cable toward the opposite end of its path of travel, said slide element being freely slidable on the plunger during the return strokes of said one cable.

10. For an automotive vehicle having a body provided with a number of doors each having a lock provided with a reciprocable plunger, plunger control means as set forth in claim 9 wherein the structure operably connecting each remaining cable with the corresponding plunger comprises a collar on the plunger having an integral extension slidably mounted on the cable; a pair of spaced stops on said cable; and a spring on the cable between each stop respecitvely and the extension, one of said springs being engageable with said extension during reciprocation of the cable toward each end of its path of travel, the extension being freely slidable relative to the cable during return strokes of the latter.

11. For an automotive vehicle having a body provided with a number of doors each having a lock provided with a reciprocable plunger, plunger control means as set forth in claim 7 wherein the structure operably connecting at least one of said cables with its plunger comprises a slide element having spaced, perforated legs slidably mounted on the plunger; means attaching the slide element to said one cable for reciprocation therewith; a collar on the plunger between the legs; and a spring between each of said legs respectively and said collar, one of said springs being engageable with said collar during reciprocation of the said one cable toward one end of its path of travel, the other of said springs being engageable with the collar during reciprocation of said one cable toward the opposite end of its path of travel, said slide element being freely slidable on the plunger during return strokes of said one cable.

12. For an automotive vehicle having a body provided with a number of doors each having a lock provided with a reciprocable plunger, plunger control means as set forth in claim 11 wherein the structure operably connecting each remaining cable with the corresponding plunger comprises a collar on the plunger having an integral extension slidably mounted on the cable; a pair of spaced stops on said cable; and a spring on the cable between each stop respectively and the extension, one of said springs being engageable with said extension during reciprocation of the cable toward each end of its path of travel, the extension being freely slidable relative to the cable during return strokes of the latter.

References Cited in the file of this patent

UNITED STATES PATENTS

| | | |
|---|---|---|
| 1,970,807 | Lovell | Aug. 21, 1934 |
| 2,001,787 | Lakin | May 21, 1935 |
| 2,103,363 | Hansen | Dec. 28, 1937 |
| 2,329,309 | Ward et al. | Sept. 14, 1943 |
| 2,339,170 | Jacobs | Jan. 11, 1944 |
| 2,371,370 | Ward | Mar. 13, 1945 |
| 2,672,943 | Chatlynne | Mar. 23, 1954 |